US008285917B2

(12) United States Patent  (10) Patent No.: US 8,285,917 B2
Jullien et al.  (45) Date of Patent: Oct. 9, 2012

(54) APPARATUS FOR ENHANCING FLASH MEMORY ACCESS

(75) Inventors: Pascal Jullien, Vence (FR); Cedric Chillie, Mougins (FR)

(73) Assignee: Scaleo Chip, Valbonne, Sophia Antipolis (FR)

( * ) Notice: Subject to any disclaimer, the term of this patent is extended or adjusted under 35 U.S.C. 154(b) by 616 days.

(21) Appl. No.: 12/411,962

(22) Filed: Mar. 26, 2009

(65) Prior Publication Data
US 2010/0250827 A1  Sep. 30, 2010

(51) Int. Cl.
G06F 12/02 (2006.01)
G11C 16/10 (2006.01)

(52) U.S. Cl. .............. 711/103; 711/157; 711/E12.008; 711/E12.079

(58) Field of Classification Search .................. None
See application file for complete search history.

(56) References Cited

U.S. PATENT DOCUMENTS

| | | | |
|---|---|---|---|
| 5,640,349 A | 6/1997 | Kakinuma et al. | |
| 5,761,732 A | 6/1998 | Shaberman et al. | |
| 5,799,168 A | 8/1998 | Ban | |
| 6,654,313 B2 | 11/2003 | Roohparvar | |
| 6,721,843 B1 * | 4/2004 | Estakhri | 711/103 |
| 7,007,132 B2 | 2/2006 | Soerensen et al. | |
| 7,579,683 B1 * | 8/2009 | Falik et al. | 711/157 |
| 2002/0012278 A1 | 1/2002 | Akaogi et al. | |
| 2003/0033573 A1 * | 2/2003 | Tamura et al. | 714/763 |
| 2003/0137884 A1 | 7/2003 | Roohparvar | |
| 2004/0153613 A1 | 8/2004 | Roohparvar | |
| 2004/0196690 A1 | 10/2004 | Roohparvar | |
| 2004/0230754 A1 * | 11/2004 | Gumm et al. | 711/147 |
| 2005/0015539 A1 * | 1/2005 | Horii et al. | 711/103 |
| 2006/0044933 A1 | 3/2006 | Roohparvar | |
| 2006/0152981 A1 * | 7/2006 | Ryu | 365/194 |
| 2007/0168625 A1 | 7/2007 | Cornwell et al. | |
| 2007/0288687 A1 * | 12/2007 | Panabaker | 711/103 |
| 2008/0052452 A1 * | 2/2008 | Chow et al. | 711/103 |
| 2008/0094893 A1 * | 4/2008 | Choi | 365/185.03 |
| 2008/0147968 A1 * | 6/2008 | Lee et al. | 711/103 |
| 2008/0151637 A1 * | 6/2008 | Doyle | 365/185.22 |
| 2008/0256417 A1 * | 10/2008 | Andersson | 714/762 |

FOREIGN PATENT DOCUMENTS

| | | |
|---|---|---|
| JP | 2002-236610 | 8/2002 |
| KR | 10-2007-0089900 | 9/2007 |

OTHER PUBLICATIONS

"Open NAND Flash Interface Specification, Revision 2.0", (Feb. 27, 2008).
Min, Sang L., et al., "Current Trends in Flash Memory Technology", *Asia and South Pacific Conference on Design Automation*, (2006), pp. 332-333.
Patterson, D. A., et al., "Computer Architecture a Quantitative Approach", Morgan Kaufmann Publishers, (2003), pp. 450-451.

* cited by examiner

*Primary Examiner* — Jasmine Song
*Assistant Examiner* — Daniel Bernard
(74) *Attorney, Agent, or Firm* — Blakely Sokoloff Taylor & Zafman LLP

(57) ABSTRACT

An apparatus for interfacing between a CPU and Flash memory units, enabling optimized sequential access to the Flash memory units. The apparatus interfaces between the address, control and data buses of the CPU and the address, control and data lines of the Flash memory units. The apparatus anticipates the subsequent memory accesses, and interleaves them between the Flash memory units. An optimization of the read access is therefore provided, thereby improving Flash memory throughput and reducing the latency. Specifically, the apparatus enables improved Flash access in embedded CPUs incorporated in a System-On-Chip (SOC) device.

16 Claims, 7 Drawing Sheets

APPARATUS FOR ENHANCING FLASH MEMORY ACCESS

BACKGROUND OF THE INVENTION

1. Field of the Invention

The present invention relates generally to a controller module for Flash memory. More specifically, it relates to an apparatus and methods for optimization of memory latency and throughput from a plurality of Flash memory units by providing sequential read access optimization through interleaving the access among the Flash memory units, and is applicable to CPU access on embedded Flash in a System-On-Chip (SOC).

2. Prior Art

Flash memory is widely used as non-volatile memory in many applications, including personal computers, solid state memory drives, as well as devices such MP3 and media players which require storage when not connected to a power source. NAND Flash provides a non-volatile memory solution that balances density and cost, with memory sizes of several gigabytes.

Processor speeds have been increasing much faster than memory speeds, leading to the well-known "processor-memory gap." CPU speeds may be in the gigahertz range, with central bus speeds of over 500 MHz. These high speeds create a need for high throughput and low latency memory access from memory components. In the case of memory, the typical access speeds are considerably lower than the processor speed, leading to lower throughput and long latency times both for memory read and for memory write. Flash controllers typically must insert several wait-states on the bus when accesses to Flash memory are done by the Processor. A solution based on using memory cache is possible but more expensive and high in power consumption. Such cache-based solutions would not be typically appropriate for embedded applications, as often deployed on a System-On-Chip (SOC).

Solutions for improving the Flash memory throughput often employ Flash controller devices and modules, which interface between the CPU and the Flash memory. The Flash controller can use techniques such as interleaving multiple flash memories to improve throughput. Interleaved memory is a technique well-known in the prior art for increasing memory throughput using multiple memory units. In this technique, Flash controllers use one or more address bits to select a Flash memory unit from a set of Flash memory units, and accesses the Flash memory units on multiple buses. Successive memory accesses, such as successive Flash read operations, can be executed by accessing the multiple Flash units in parallel, thus shortening the overall access time and improving throughput. By accessing the Flash memory units over separate buses, the Flash controllers are also able to reduce memory latency. For example, interleaving two 8-bit Flash devices each operating at 33 MHz would give an effective throughput of 66 MHz. In the prior art, an exemplary solution is described wherein a Flash controller is used to interleave data between two 8-bit Flash units, thereby allowing 16-bits of data to be fetched by accessing the two Flash units in parallel. However, the use of interleaving alone is not sufficient to provide Flash unit access for sequential address access with no wait states as the ratio between the Flash access time and the system clock period increases.

Thus there is a need to provide a general solution for high throughput and low latency Flash memory read access which would be useable by any type of Flash memory. Such a solution should be able to meet the needs of high clock speeds used by current CPUs. The solution should be applicable to embedded Flash access in a System-On-Chip.

DETAILED DESCRIPTION OF THE PREFERRED EMBODIMENTS

An apparatus for interfacing between a CPU and Flash memory units, enabling optimized sequential access to the Flash memory units. The apparatus interfaces between the address, control and data buses of the CPU and the address, control and data lines of the Flash memory units. The apparatus anticipates the subsequent memory accesses, and interleaves them between the Flash memory units. An optimization of the read access is therefore provided, thereby improving Flash memory throughput and reducing the latency. Specifically, the apparatus enables improved Flash access in embedded CPUs incorporated in a System-On-Chip (SOC) device.

Flash memory devices are commonly used as non-volatile memory in many applications. While providing non-volatile storage, Flash devices have access times for data read that are slower than the system clock speed, and have long data latency. The Flash controller is forced to insert wait states in reading data from Flash devices during CPU access. This problem, the Flash device "memory-processor gap", has been compounded by the rapid increase in processor speed and system clock rate. Accordingly, the invention suggests a general Flash controller that uses interleaving access to a plurality of Flash devices, combined with on-controller cache buffer to reduce the read access time and latency.

Specifically, an embodiment of the invention comprises of a Flash controller which is connected to a plurality of interleaved Flash memory units and the Advanced High-Performance Bus (AHB), Advanced Peripheral Bus (APB) as well as the clock and other control signals of the system. By using anticipation of read access and interleaved memory, the Flash controller reduces the number of wait states required for Flash memory access and reduces the access latency.

Figure 1:
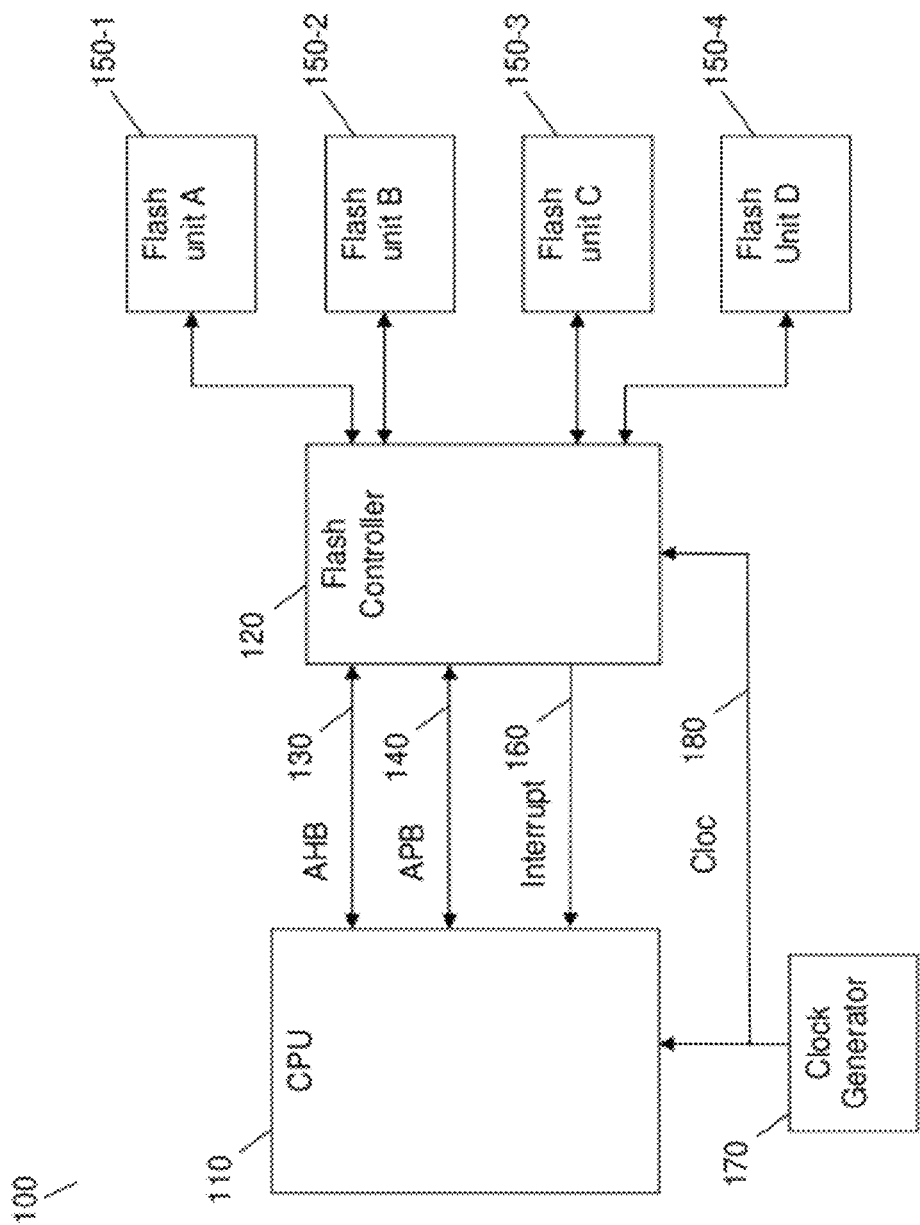
FIG. 1 is a block diagram showing the Flash controller interfaced to a CPU and 4 Flash units.

Reference is now made to FIG. 1 where an exemplary and non-limiting block diagram 100 of a system, comprising the Flash Controller 120, is shown. In one embodiment system 100 may be implemented from monolithic semiconductor modules. In an alternative embodiment, system 100 may be implemented as a System-On-Chip (SOC). This diagram shows system 100, comprising of the CPU 110 and the Flash Controller 120. The Flash Controller 120 is coupled to the CPU 110 through the AHB 130 and APB 140. The Flash Controller 120 is connected to a plurality of Flash memory units. In the exemplary system shown in this figure, the Flash Controller 120 is connected to four Flash units, shown as Flash unit A 150-1, Flash unit B 150-2, Flash unit C 150-3 and Flash unit D 150-4. The Flash Controller 120 may be connected, in this example, to 2, 3 or 4 Flash memory units. The Flash Controller 120 provides an interrupt signal 160 to the CPU or to a programmable interrupt controller (not shown). The Clock Generator 170 provides the system clock signal 180.

Figure 2:
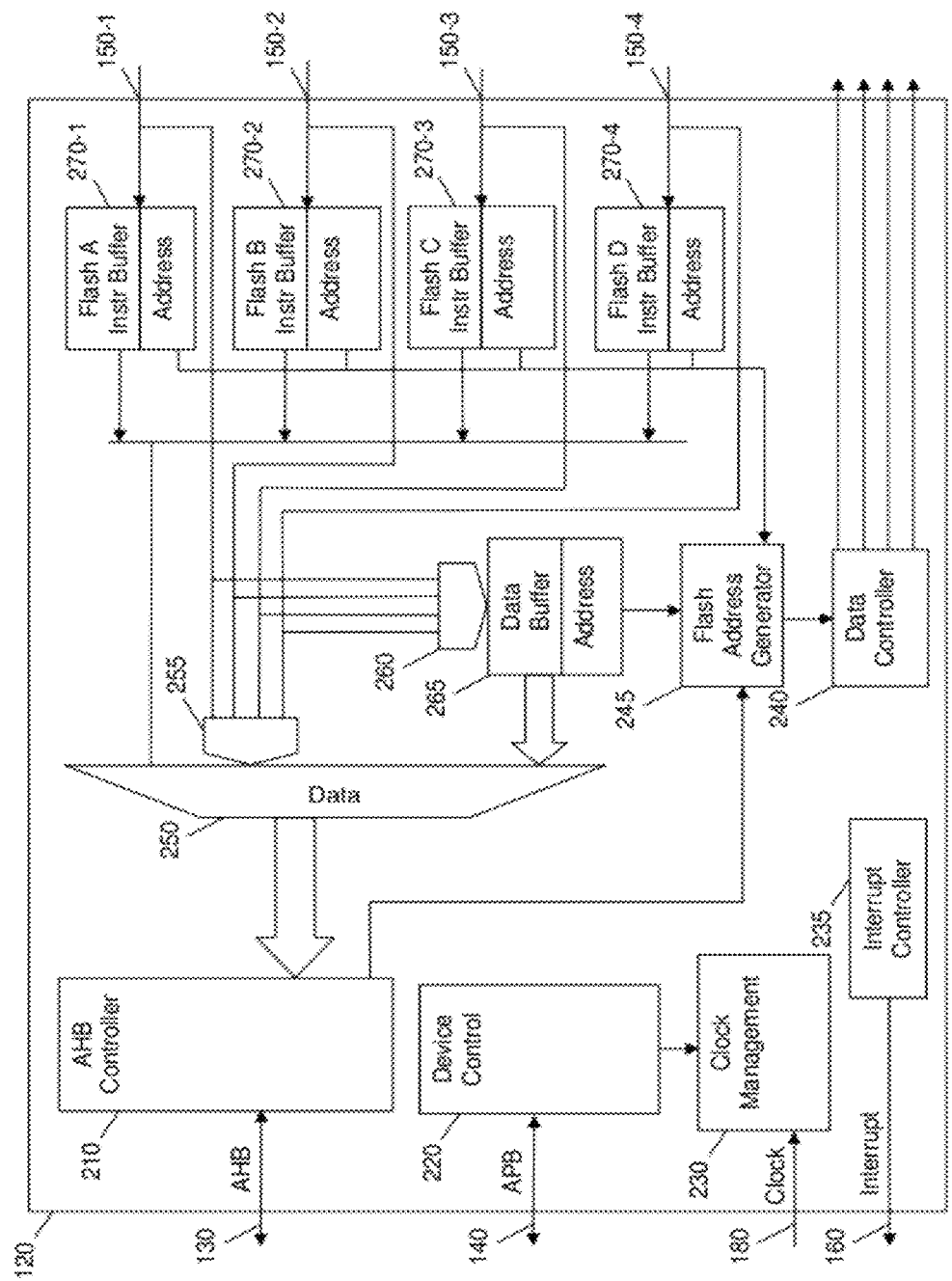
FIG. 2 is a detailed block diagram of the Flash Controller.

Reference is now made to FIG. 2, where an exemplary and non-limiting detailed block diagram of the Flash Controller 120 is shown. The Flash Controller 120 is enabled to interface to up to four Flash units. The Flash Controller 120 is comprised of the AHB controller 210, which interfaces the Flash controller to the AHB bus 130. The Flash Controller 120 is further comprised of the Device Control module 220, which interfaces the Flash Controller to the APB bus 140. The control and status registers are mapped by the Device Control 220. The control registers enable the programming of the CLK_DIV, the clock division ratio N between system clock frequency and flash clock frequency, where N is a whole number (or the ratio N between the flash clock period and the system clock period). The Flash Controller 120 is further comprised of the Clock Management module 230, which is connected to the clock signal 180. The Flash Controller 120 is further comprised of the Interrupt Controller 235, which provides the interrupt signal 160. An interrupt is provided on operations such as the end of a write operation or an erase operation. The Flash Controller 120 interfaces to each Flash unit 150-n using address, data and control lines for each Flash unit. In the exemplary system shown in this diagram, the Flash Controller 120 has interfaces for four Flash units. These interfaces are enabled for reading and writing instructions and data. The read interfaces use a set of buffer units. Instruction buffer units 270-1, 270-2, 270-3 and 270-4 are each dedicated to a specific Flash memory unit. Each instruction buffer contains instructions and the memory address corresponding to the instruction. The data buffer unit 265 is shared between the Flash memory units 150 through the multiplexer 260. The data buffer contains data and the memory address corresponding to the data. The number of instructions or data stored in a buffer is configurable. In the example shown in this figure, there are four instructions buffers and one data buffer. This configuration reflects the fact that in most cases, the CPU fetches instructions from the Flash in comparison with other data read requests. The CPU access requests for instructions stored in Flash memory are approximately 80% of the Flash read access requests. When the Flash Controller 120 performs a read access on a Flash memory unit, the address and corresponding data or instruction are stored sequentially in a buffer, in first-in-first-out manner. The oldest data or instruction in the buffer is overwritten by the newest data or instruction. The flash unit data buses are connected to multiplexer 255 and to multiplexer 260, which is connected to the data buffer 265. The instruction buffers 270-1, 270-2, 270-3 and 270-4, the data buffer 265 and the multiplexer 255, are connected to multiplexer 250 which interfaces to the AHB controller 210. The Flash Controller 120 is further comprised of the Data Controller module 240, which is responsible for the status of the data in the buffers. The Flash Controller 120 is further comprised of a Flash Address Generator 245, which is responsible for comparison of the Flash address to be accessed by the CPU with the addresses already stored in the data and instructions buffers, generation of the address and control for accessing each Flash memory unit, and for anticipation of the next Flash address in sequential access.

Figure 3:
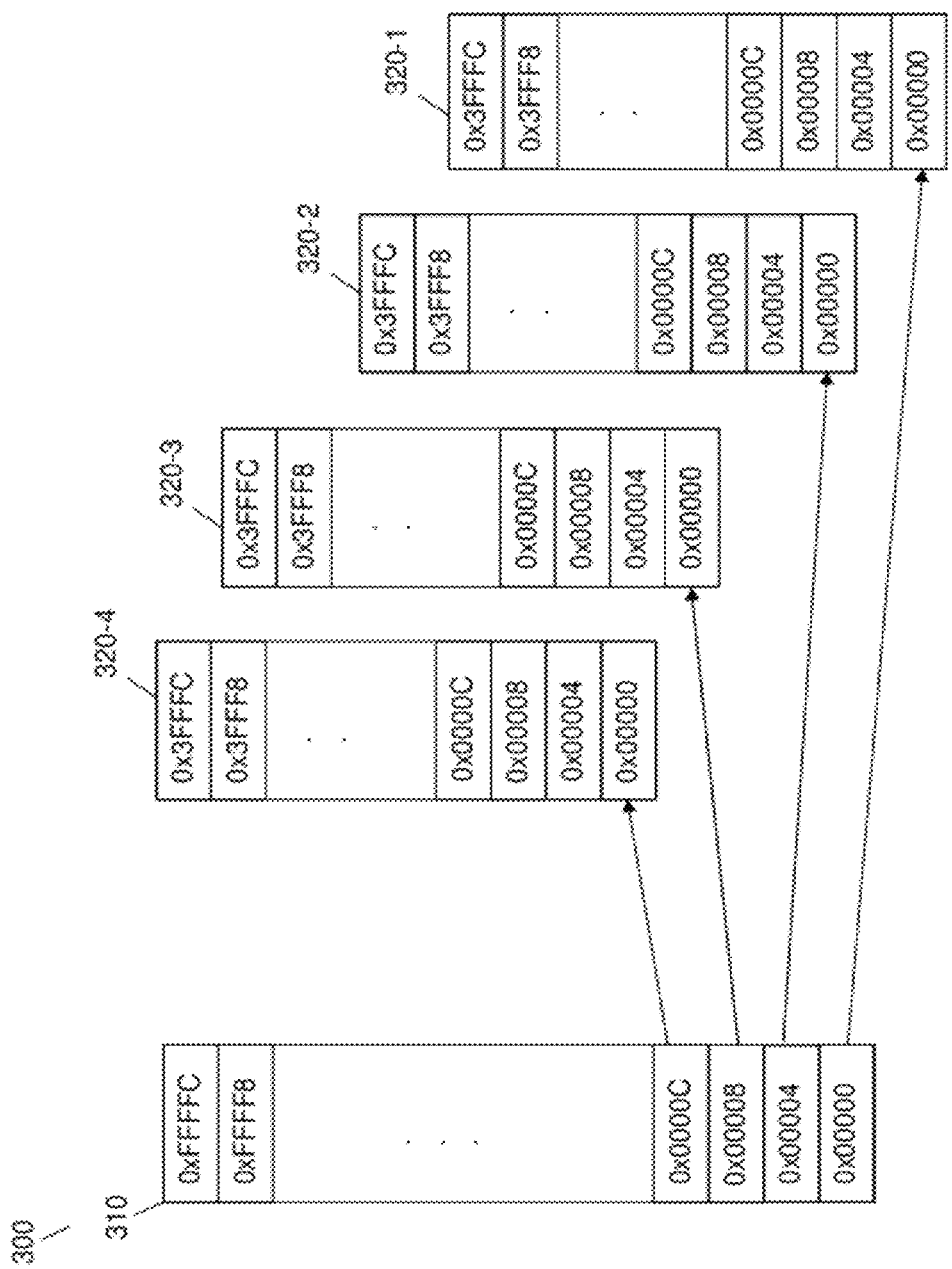
FIG. 3 is a schematic drawing of the memory address spaces.

Reference is now made to FIG. 3, where an exemplary and non-limiting schematic diagram 300 of the Flash Controller 120 memory map is shown. The address space of the system is shown in memory map 310. In this example, each Flash memory has a bus of 32 bit data width. The Flash Controller maps the system address space 310 to the interleaved memory space of each of four Flash memory units, shown by memory spaces 320-1, 320-2, 320-3 and 320-4. The Flash Controller 120 uses the lower bits of the least significant byte of the address to construct the memory mapping between the requested address and actual Flash memory unit and the Flash memory unit address. This memory mapping is used by the Flash Controller 120 to generate the Flash unit addresses to read from and write to the Flash units 150-1, 150-2, 150-3 and 150-4.

For power consumption optimization, the CPU can run at different frequency. For this reason the Flash controller can operate in a normal mode and in a high speed mode. The normal mode is used when the system clock period is higher than the Flash memory data access time. The high speed mode is used when the system clock period is lower than the Flash memory data access time.

Figure 4:
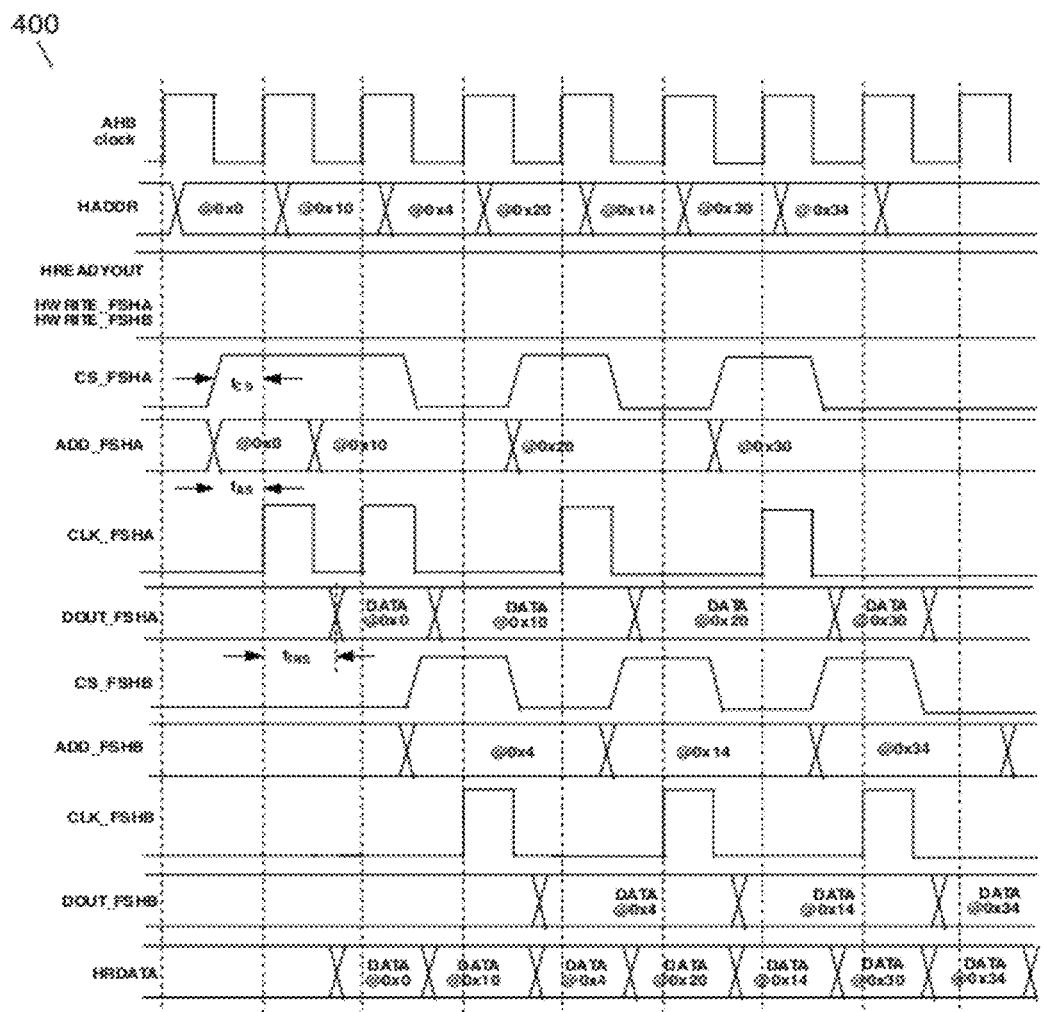
FIG. 4 illustrates the timing of signals for read access in normal mode for non-sequential addresses.

Reference is now made to FIG. 4, where an exemplary and non-limiting schematic diagram 400 illustrates the timing of signals for read access in normal mode for non-sequential addresses from two Flash memory units. This figure shows the signals AHB clock which is the input clock on the AHB Bus 130, HADDR which are the input address lines of the read request from the AHB Bus 130, HREADY_OUT which is the output signal on AHB Bus 130 indicating the read transfer is complete, HWRITE_FSHA and HWRITE_FSHB are the Flash write output to the Flash units. CS_FSA and CS_FSB are the Flash unit chip select signal from the Flash Controller 120 to Flash unit 150-1 and Flash unit 150-2, respectively. ADD_FSHA and ADD_FSHB are the Flash unit address request from the Flash Controller 120 to Flash unit A 150-1 and Flash unit B 150-2 respectively. CLK_FSHA and CLK_FSHB are the clock signals from the Flash Controller 120 to Flash unit A 150-1 and Flash unit B 150-2 respectively. DOUT_FSHA and DOUT_FSHB are the flash unit data out signals from Flash unit A 150-1 and Flash unit B 150-2 respectively to the Flash Controller 120. HRData is the read data signals from the Flash Controller 120 on the AHB Bus 130. In normal mode, read accesses take one cycle of the system clock and are done without wait states. As shown in the illustration, there is an initial read latency before the data is available. The timing of signals for sequential access is also without wait states.

Figure 5:
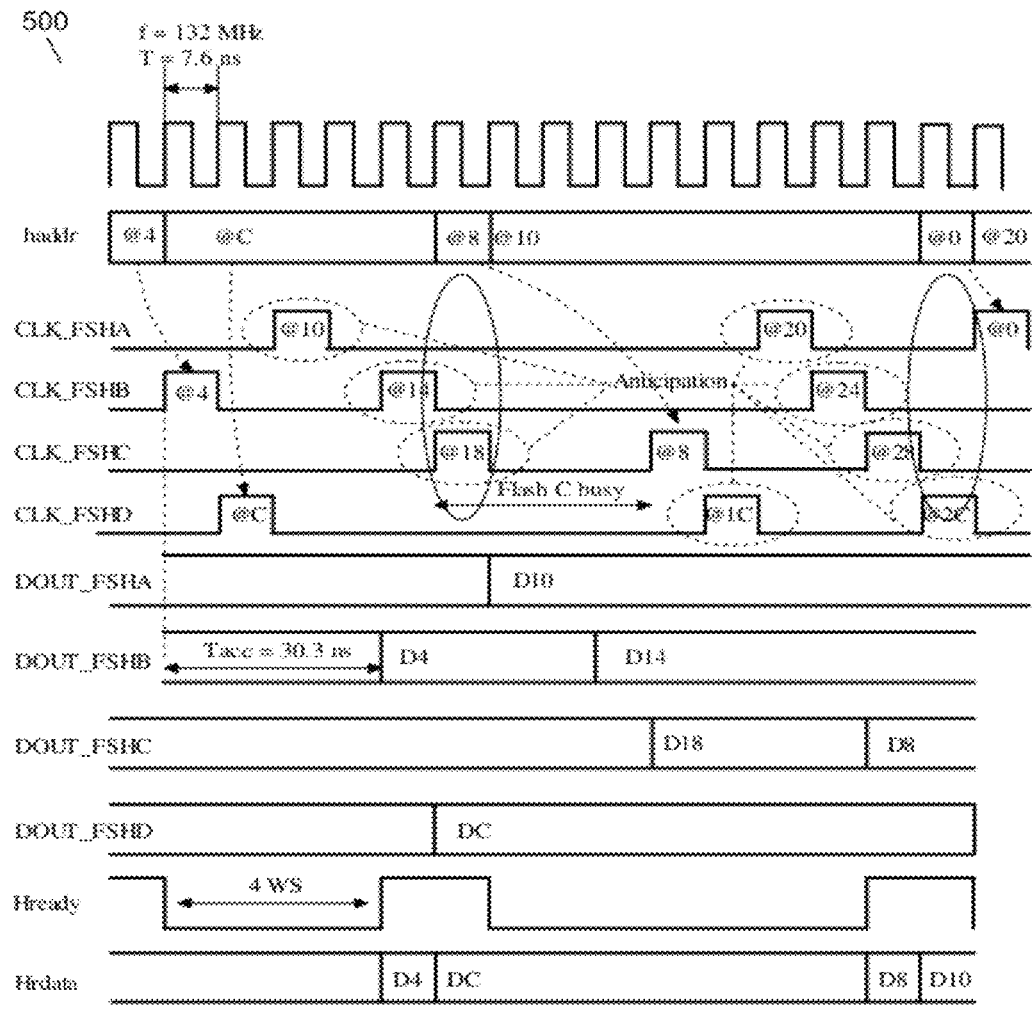
FIG. 5 illustrates the timing of signals for read access for non-sequential addresses to four Flash memory units.

Reference is now made to FIG. 5, where an exemplary and non-limiting schematic diagram 500, which illustrates the timing of signals for read access in high speed mode for non-sequential addresses, in accordance with the disclosed invention. This figure shows the signals AHB clock which is the input clock on the AHB Bus 130, HADDR which are the input address lines of the read request from the AHB Bus 130, HREADY_OUT which is the output signal on AHB Bus 130 indicating the read transfer is complete. CLK_FSHA, CLK_FSHB, CLK_FSHC and CLK_FSHD are the clock signals from the Flash Controller 120 to Flash unit A 150-1, Flash unit B 150-2, Flash unit C 150-3 and Flash unit D 150-4 respectively. DOUT_FSHA, DOUT_FSHB, DOUT_FSHC and DOUT_FSHD are the flash unit data out signals from Flash unit A 150-1, Flash unit B 150-2, Flash unit C 150-3 and Flash unit D 150-4 respectively to the Flash Controller 120. HRData is the read data signals from the Flash Controller 120 on the AHB Bus 130. In high speed mode, each Flash unit runs at the system clock frequency, divided by the CLK_DIV factor maintained by the clock manager. The CLK_DIV may be 2, 3 or 4. The case illustrated in diagram 500 uses CLK_DIV=4. In this case of non-sequential access, the first instruction is accessed after four wait states. The Flash Controller 120 anticipates the access to the contiguous address instruction using the Flash Address Generator 245. Successively addressed instructions are stored in the cache buffers such as the instruction buffer units 270-1, 270-2, 270-3 and 270-4 while a non sequential access is not requested by the CPU. When a non sequential address is requested the anticipation is restarted based on the new requested address. The Flash Address Generator 245 also determines if requested instruction exists in the cache buffers. In this illustration, the read access starts at address @4, which is accessed from Flash unit B 150-2 and is available for read after 4 wait states. The instruction is sent to the CPU over the AHB 130 and stored in instruction buffer 270-2. The next address requested is @C. As shown in this illustration, the instruction at address @C is accessed from Flash unit D 150-4. If this instruction at address @C had already been in the cache such as in the instruction buffer 270-4, the instruction would be available without need to access Flash unit D 150-4 again. The Flash Controller anticipates access to @10 and generates a read access request to Flash unit A 150-1, and then a read access to @14 to Flash unit B 150-2 and a read access request to @18 to Flash unit C 150-3. The next access request to the Flash Controller 120, however, is to address @8. The Flash Controller must access @8 on Flash unit C 150-3, which is busy with the anticipated access to @18, delaying access to @8. The data output by the Flash Controller 120 on the AHB Bus 130 as requested are non-sequential order is instruction @4, instruction @C, instruction @8 and instruction @10.

Figure 6:
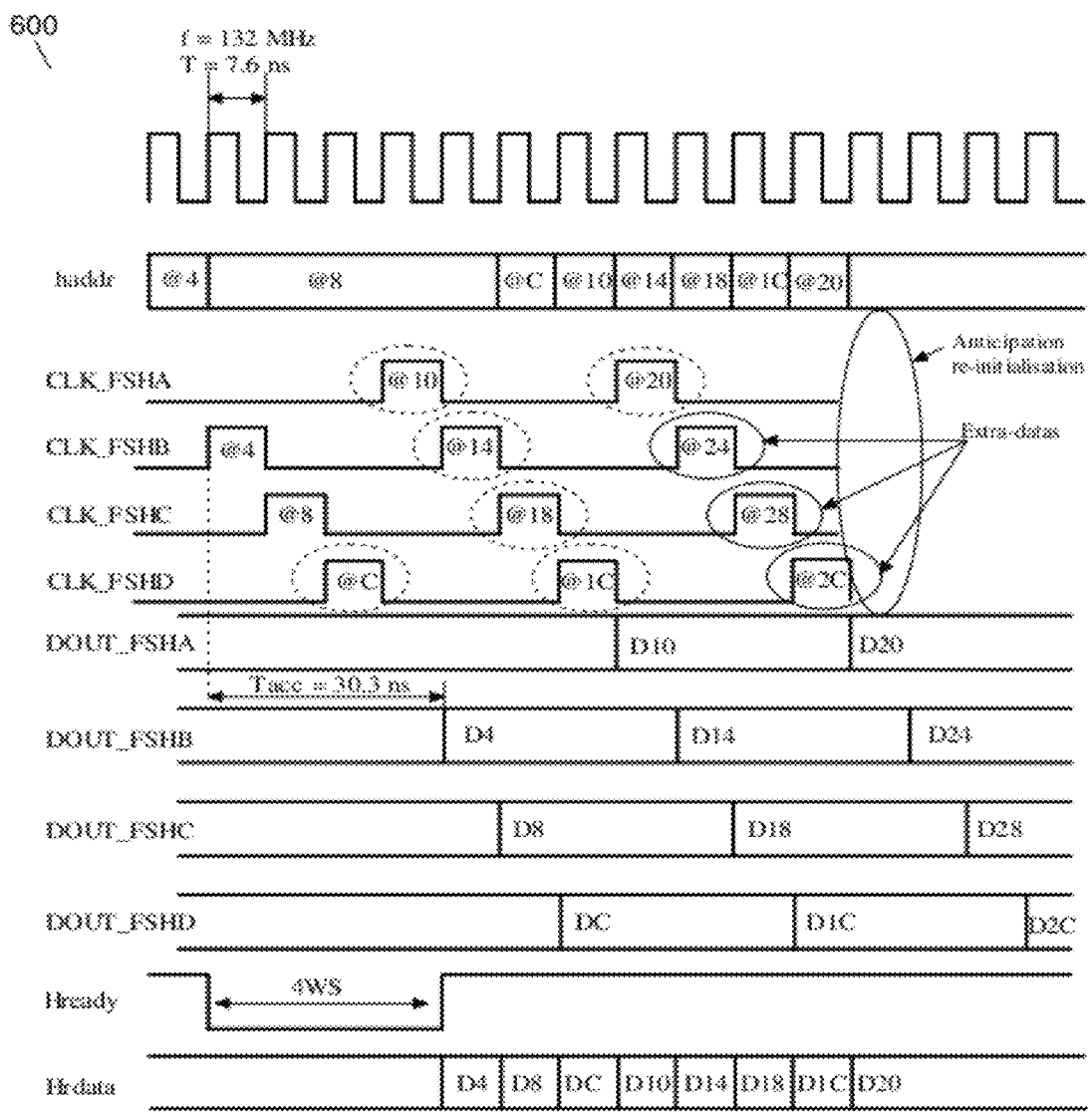
FIG. 6 illustrates the timing of signals for read access for sequential addresses to four Flash memory units with CLK_DIV=4.

Reference is now made to FIG. 6, where an exemplary and non-limiting schematic diagram 600 illustrates the timing of signals for read access in high speed mode for sequential addresses in accordance with the disclosed invention. This figure shows the signals AHB clock which is the input clock on the AHB Bus 130, HADDR which are the input address lines of the read request from the AHB Bus 130, HREADY_OUT which is the output signal on AHB Bus 130 indicating the read transfer is complete. CLK_FSHA, CLK_FSHB, CLK_FSHC and CLK_FSHD are the clock signals from the Flash Controller 120 to Flash unit A 150-1, Flash unit B 150-2, Flash unit C 150-3 and Flash unit D 150-4 respectively. DOUT_FSHA, DOUT_FSHB, DOUT_FSHC and DOUT_FSHD are the flash unit data out signals from Flash unit A 150-1, Flash unit B 150-2, Flash unit C 150-3 and Flash unit D 150-4 respectively to the Flash Controller 120. HRData is the read data signals from the Flash Controller 120 on the AHB Bus 130. In high speed mode, sequential read accesses are consecutive. The first access takes 2, 3 or 4 wait states, depending on the CLK_DIV. The successive sequential accesses are anticipated and accessed without wait states. The case illustrated in diagram 600 uses CLK_DIV=4. In this case of sequential access, the first instruction is accessed after four wait states. The Flash Controller 120 anticipates the access to the contiguous address instruction using the Flash Address Generator 245. Successively addressed instructions are stored in the cache buffers such as the instruction buffer units 270-1, 270-2, 270-3 and 270-4 while a non sequential access is not requested by the CPU. When a non sequential address is requested the anticipation is restarted based on the new requested address. The Flash Address Generator 245 also determines if requested instruction exists in the cache buffers. In this illustration, the read access starts at address @4, which is accessed from Flash unit B 150-2 and is available for read after 4 wait states. The next address requested is @8. As shown in this illustration, the instruction at address @8 is accessed from Flash unit C 150-3. If this instruction at address @8 had already been in the cache such as in the instruction buffer 270-3, the instruction would be available without need to access Flash unit C 150-3 again. The Flash Controller 120 anticipates access to @C and generates a read access request to Flash unit D 150-4, and then successively generates a read access request to @10 to Flash unit A 150-1, read access request to @14 to Flash unit B 150-2, a read access to @18 to Flash unit C 150-3, a read access to @1C to Flash unit D 150-4 and a read access to @20 to Flash unit A 150-1. The data output by the Flash Controller 120 on the AHB Bus 130 are available in sequential order of instruction @4, instruction, @8 instruction, @C instruction, @10 instruction, @14 instruction, @18 instruction and @20 instruction as requested without any wait state. The Flash Controller 120 continues to anticipate the sequential access of instructions and allows instruction access without wait states to successively addressed instructions.

Figure 7:
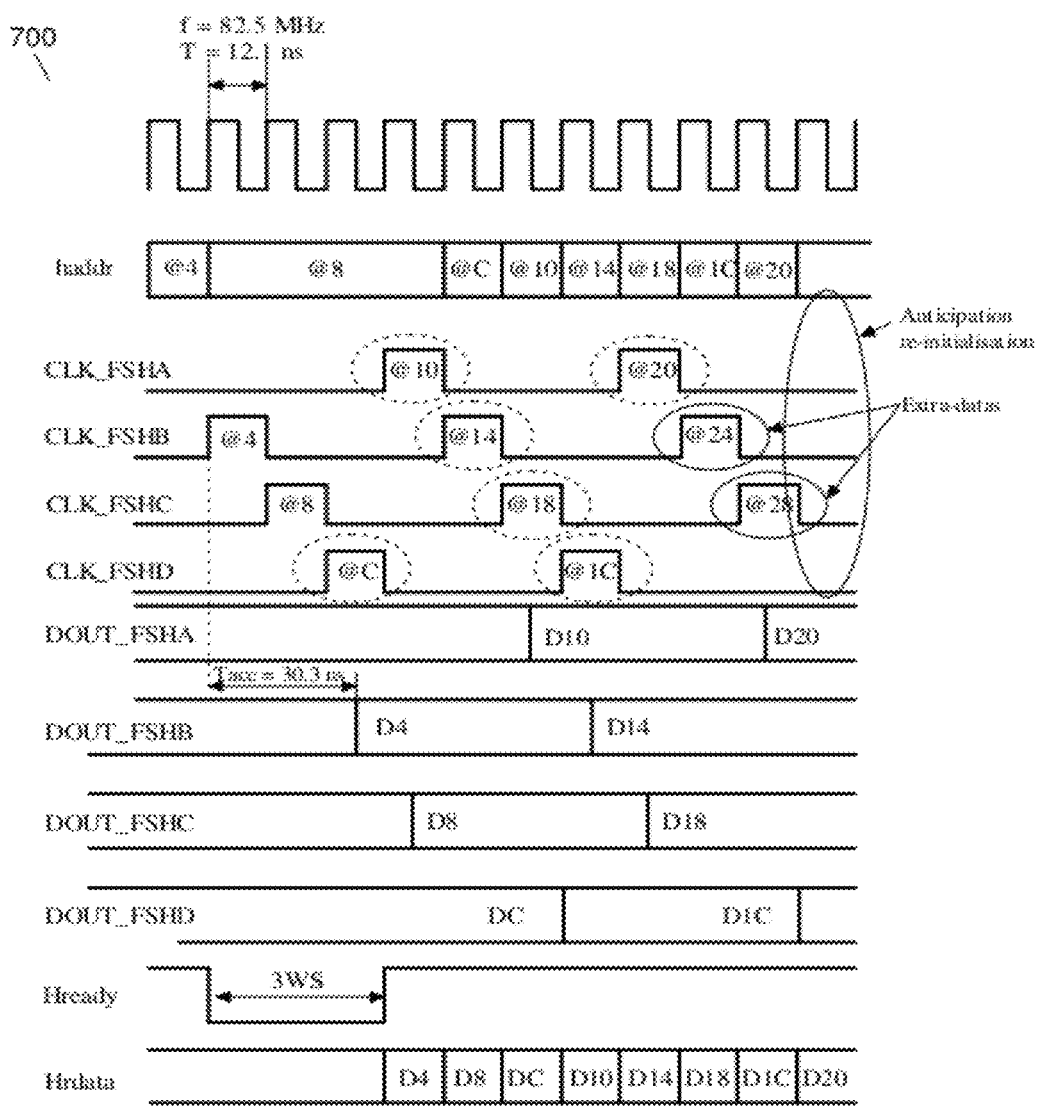
FIG. 7 illustrates the timing of signals for read access for sequential addresses to four Flash memory units with CLK_DIV=3.

Reference is now made to FIG. 7, where an exemplary and non-limiting schematic diagram 700 illustrates the timing of signals for read access in high speed mode for sequential addresses in accordance with the disclosed invention. This figure shows the signals AHB clock which is the input clock on the AHB Bus 130, HADDR which are the input address lines of the read request from the AHB Bus 130, HREADY_OUT which is the output signal on AHB Bus 130 indicating the read transfer is complete. CLK_FSHA, CLK_FSHB, CLK_FSHC and CLK_FSHD are the clock signals from the Flash Controller 120 to Flash unit A 150-1, Flash unit B 150-2, Flash unit C 150-3 and Flash unit D 150-4 respectively. DOUT_FSHA, DOUT_FSHB, DOUT_FSHC and DOUT_FSHD are the flash unit data out signals from Flash unit A 150-1, Flash unit B 150-2, Flash unit C 150-3 and Flash unit D 150-4 respectively to the Flash Controller 120. HRData is the read data signals from the Flash Controller 120 on the AHB Bus 130. The case illustrated in diagram 700 uses CLK_DIV=3. In this case of sequential access, the first instruction is accessed after three wait states. The Flash Controller 120 anticipates the access to the contiguous address instruction using the Flash Address Generator 245. Successively addressed instructions are stored in the cache buffers such as the instruction buffer units 270-1, 270-2, 270-3 and 270-4 while a non sequential access is not requested by the CPU. When a non sequential address is requested the anticipation is restarted based on the new requested address. The Flash Address Generator 245 also determines if requested instruction exists in the cache buffers. In this illustration, the read access starts at address @4, which is accessed from Flash unit B 150-2 and is available for read after 3 wait states. The next address requested is @8. As shown in this illustration, the instruction at address @8 is accessed from Flash unit C 150-3. If this instruction at address @8 had already been in the cache such as in the instruction buffer 270-3, the instruction would be available without need to access Flash unit C 150-3 again. The Flash Controller anticipates access to @C and generates a read access request to Flash unit D 150-4, and then successively generates a read access request to @10 to Flash unit A 150-1, read access request to @14 to Flash unit B 150-2, a read access to @18 to Flash unit C 150-3, a read access to @1C to Flash unit D 150-4 and a read access to @20 to Flash unit A 150-1. The data output by the Flash Controller 120 on the AHB Bus 130 are available in sequential order of instruction @4 instruction, @8 instruction, @C instruction, @10 instruction, @14 instruction, @18 instruction and @20 instruction as requested without any wait state. The Flash Controller 120 continues to anticipate the sequential access of instruction and allows the instruction access without wait states to sequentially addressed instructions until the end of the sequence of successive address access.

While the disclosed invention is described hereinabove with respect to specific exemplary embodiments it is noted that other implementations are possible that provide the advantages described hereinabove, and which do not depart from the spirit of the inventions disclosed herein. Such embodiments are specifically included as part of this invention disclosure which should be limited only by the scope of its claims. Furthermore, the apparatus disclosed in the invention may be implemented as a semiconductor device on a monolithic semiconductor. The apparatus disclosed in the invention may be implemented, in one non-limiting embodiment, as a semiconductor module as part of a System-On-Chip semiconductor device on a monolithic semiconductor. Other embodiments of the apparatus may be also implemented without departing from the scope of the disclosed invention.

What is claimed is:

1. A method for interleaved read access to a plurality of Flash memory units by a controller comprising:
   anticipating, responsive of at least current and past accesses to the plurality of Flash memory units, at least a successive read access request sequential to a current read access request by a processing unit from the plurality of Flash memory units;
   mapping the read access requests to the plurality of Flash memory units to enable the interleaved read access;
   scheduling the interleaved read access requests to the plurality of Flash memory units;
   requesting the interleaved read access from each of the plurality of Flash memory units according to said mapping and said scheduling.

2. The method of claim 1, wherein said access of successive read access comprises:
   configuring the controller responsive to a ratio of the Flash memory unit's access time to the system clock period.

3. The method of claim 2, wherein said ratio is N, where N is a whole number.

4. The method of claim 3, wherein N has the value of 2, 3 or 4.

5. The method of claim 3, where N also equals the number of Flash memory units.

6. The method of claim 3, where N is not equal to the number of Flash memory units.

7. The method of claim 1, wherein said mapping the read requests comprises:
   generating an address for access of a Flash memory unit by selecting a Flash memory unit in an interleaved manner from the plurality of Flash memory units and determining the interleaved memory address in said selected Flash memory unit.

8. An apparatus for interfacing a Central Processing Unit (CPU) to a plurality of interleaved Flash memory units comprising:
   a bus interface to the CPU for address, memory and control signals;
   an interface to the system clock generator;
   an interface for address, data and control signals for each of the plurality of interleaved Flash memory units;
   an address generation unit enabled to anticipate, responsive of at least current and past accesses to the plurality of Flash memory units, sequential access to the plurality of interleaved Flash memory units and enable to generate interleaved read access requests to the plurality of interleaved Flash memory units.

9. The apparatus of claim 8, wherein said apparatus is interfaced through an advanced high-performance bus (AHB) or an advanced peripheral bus (APB).

10. The apparatus of claim 8, further comprising:
    at least a cache buffer module for caching instructions read from the plurality of interleaved Flash memory units.

11. The apparatus of claim 8, further comprising:
    at least a cache buffer module for caching data read from the plurality of interleaved Flash memory units.

12. The apparatus of claim 8, further enabled to access the interleaved Flash memory units, each at N times the system clock period.

13. The apparatus of claim 12 wherein N equals the number of Flash memory units.

14. The apparatus of claim 12 wherein N does not equal the number of Flash memory units.

15. The apparatus of claim 12, wherein N has a value of: 2, 3; or 4.

16. The apparatus of claim 12, wherein the value of N is programmable.

* * * * *